United States Patent
Alvarez Valenzuela et al.

(10) Patent No.: US 12,218,607 B2
(45) Date of Patent: Feb. 4, 2025

(54) METHOD FOR CONTROLLING A POWER CONVERTER, AND POWER CONVERTER SYSTEM HAVING SUCH A POWER CONVERTER

(71) Applicant: Siemens Energy Global GmbH & Co. KG, Munich (DE)

(72) Inventors: Rodrigo Alonso Alvarez Valenzuela, Nuremberg (DE); Andreas Lorenz, Erlangen (DE); Dominik Schuster, Diespeck (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 260 days.

(21) Appl. No.: 17/416,615

(22) PCT Filed: Dec. 19, 2018

(86) PCT No.: PCT/EP2018/085832
§ 371 (c)(1),
(2) Date: Jun. 21, 2021

(87) PCT Pub. No.: WO2020/125968
PCT Pub. Date: Jun. 25, 2020

(65) Prior Publication Data
US 2022/0077766 A1 Mar. 10, 2022

(51) Int. Cl.
*H02M 7/483* (2007.01)
*H02M 1/32* (2007.01)

(52) U.S. Cl.
CPC .......... *H02M 7/483* (2013.01); *H02M 1/327* (2021.05); *H02M 7/4835* (2021.05)

(58) Field of Classification Search
CPC ........ H02M 1/32; H02M 1/327; H02M 7/483; H02M 7/4835; H02M 1/0025
See application file for complete search history.

(56) References Cited

U.S. PATENT DOCUMENTS

| 5,373,205 A | 12/1994 | Busick et al. |
| 5,923,135 A * | 7/1999 | Takeda ............ B60L 50/51 318/432 |

(Continued)

FOREIGN PATENT DOCUMENTS

| CN | 101548458 A | 9/2009 |
| CN | 102017383 A | 4/2011 |

(Continued)

OTHER PUBLICATIONS

Kaczorowski Dennis et al: "A novel thermal management algorithm for improved lifetime and overload capabilities of traction converters", 2015 17th European Conference on Power Electronics and Applications (EPE'15 ECCE—Europe), Jointly Owned by EPE Association and IEEE PELS, pp. 1-10, XP032800265, DOI: 10.1109/EPE.2015.7309262; [found on Oct. 27, 2015]; the whole document; 2015.

(Continued)

*Primary Examiner* — Thienvu V Tran
*Assistant Examiner* — Yahveh Comas Torres
(74) *Attorney, Agent, or Firm* — Laurence A. Greenberg; Werner H. Stemer; Ralph E. Locher

(57) ABSTRACT

A method controls a power converter in which a target value of a control parameter is limited by at least one limiting value. The method is characterized in that the at least one limiting value is determined dynamically over time as a function of a power converter temperature. A power converter system having a control device is provided and configured to carry out the method.

10 Claims, 4 Drawing Sheets

(56) References Cited

U.S. PATENT DOCUMENTS

| | | | |
|---|---|---|---|
| 7,035,064 B2* | 4/2006 | Schimanek | H03K 17/0822 361/33 |
| 10,338,172 B2* | 7/2019 | Lin | H02M 1/14 |
| 10,356,854 B2* | 7/2019 | Kanai | H05B 6/08 |
| 10,418,904 B2* | 9/2019 | Takahashi | H02M 1/32 |
| 10,824,180 B2* | 11/2020 | Hande | G05F 1/46 |
| 2003/0214770 A1* | 11/2003 | Schimanek | H03K 17/0822 361/100 |
| 2010/0067266 A1 | 3/2010 | Dommaschk et al. | |
| 2010/0320762 A1 | 12/2010 | Letas et al. | |
| 2012/0218027 A1 | 8/2012 | Ioannidis | |
| 2015/0049532 A1 | 2/2015 | Bernet et al. | |
| 2017/0027025 A1* | 1/2017 | Kanai | H05B 6/101 |

FOREIGN PATENT DOCUMENTS

| | | | |
|---|---|---|---|
| CN | 104115390 A | 10/2014 | |
| EP | 0961379 A2 | 12/1999 | |
| EP | 3392994 A1 | 10/2018 | |
| JP | 2008168669 A | 7/2008 | |
| WO | WO-2012124073 A1 * | 9/2012 | H02M 1/32 |
| WO | WO-2015093623 A1 * | 6/2015 | H02M 1/32 |
| WO | WO2018019376 A1 | 2/2018 | |

OTHER PUBLICATIONS

Wang, Longjun et al: "Lifetime estimation of IGBT modules for MMCHVDC application"; Microelectronics Reliability: An Internat. Journal & World Abstracting Service, Elsevier Science Ltd, GB; vol. 82, Feb. 3, 2018 (Feb. 3, 2018), pp. 90-99, XP085361237.

Achiri Humphrey Mokom Njawah et al: "Mitigation of electric drivetrain oscillation resulting from abrupt current derating at low coolant flow rate", IECON 2015—41 st Annual Conference of the IEEE Industrial Electronics Society, IEEE, Nov. 9, 2015 (Nov. 9, 2015), p. 3638-3642, XP032855848; 2015;—Published in English.

* cited by examiner

FIG 1

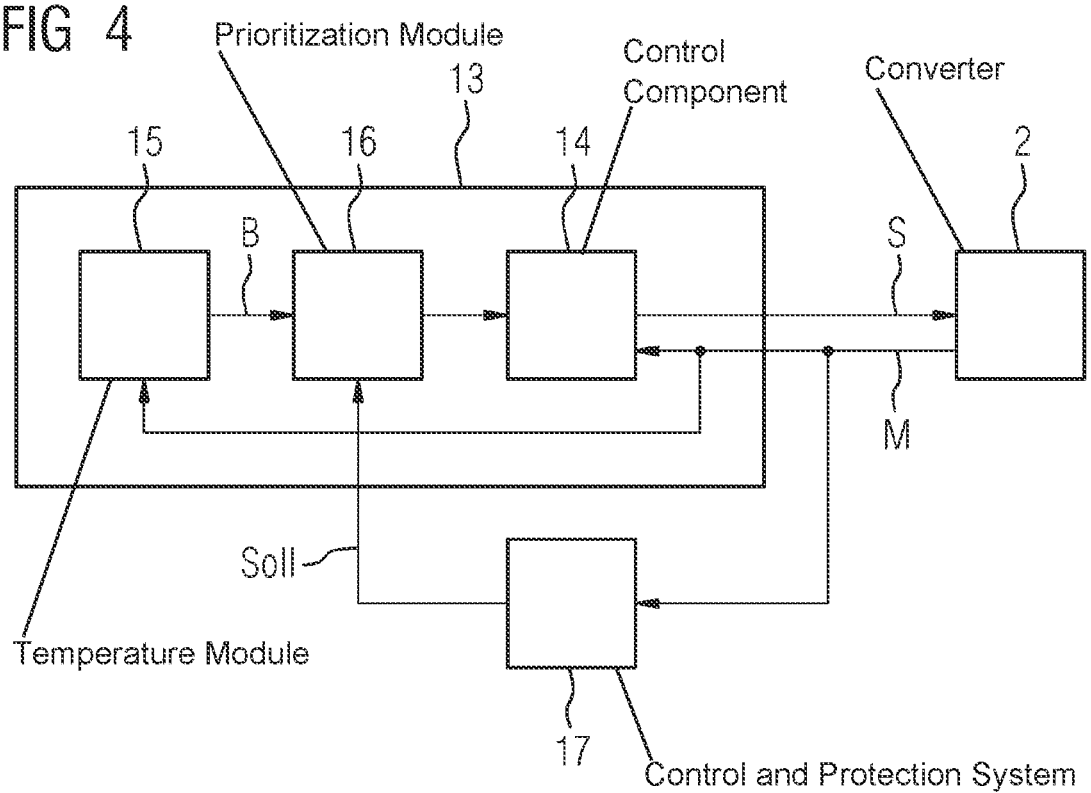
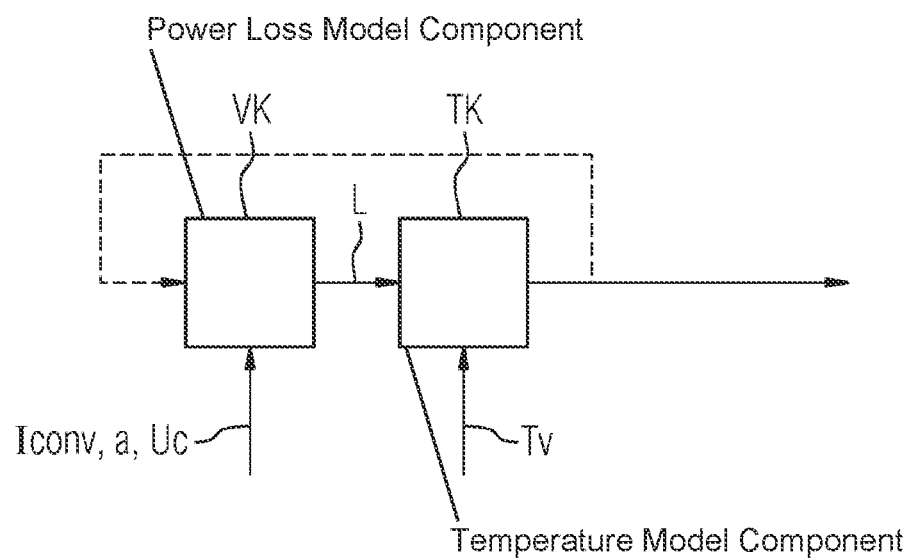

METHOD FOR CONTROLLING A POWER CONVERTER, AND POWER CONVERTER SYSTEM HAVING SUCH A POWER CONVERTER

BACKGROUND OF THE INVENTION

Field of the Invention

The present invention relates to a method for controlling a power converter, in which a setpoint of a control parameter is limited by at least one limiting value.

In many energy transmission applications, for example, in a high-voltage direct-current (HVDC) transmission system, in particular when using IGBT-based VSC technology (for example, modular multilevel converters), the power converter is a thermally sensitive component. Even short-term overloads (in the range of <1 second) of semiconductors or semiconductor switches which are installed therein may result in destruction of the power converter, with high economic costs. At the same time, high demands are placed on power converters with respect to their short-term overload capability. This generally results in a costly, overdimensioned design of the power converter.

In order to remedy the problems described above, the control of the power converters is adjusted in the known power converter systems. The adjustment comprises limiting the setpoint of one or several of the control parameters. The mostly several setpoints for controlling the power converter are usually specified by a superordinate control system. Up to now, the limitation of the setpoint has been performed by means of permanently stored characteristic or limiting values. The limiting values are usually derived approximately from calculations of stationary operating points of the power converter system.

A limitation of the control parameters is disclosed, for example, in EP 3 392 994 A1. The control proposed there provides that the corresponding control characteristics are limited by the minimum/maximum output power and the minimum/maximum continuously permissible voltage of the power converter, in order to prevent damage to the power converter.

SUMMARY OF THE INVENTION

The object of the present invention is to propose an aforementioned method, which allows the power converter to be controlled as reliably as possible.

According to the present invention, the object is achieved by means of a method of the generic type, in which the at least one limiting value is determined temporally dynamically as a function of a power converter temperature. The temporally dynamic determination of the limiting value means that the limiting value is able to change over time. For example, the determination of the limiting value may take place at predetermined time intervals. The power converter temperature is understood to be an actual or suitably determined, modeled, or estimated temperature which is present at a predetermined location on the power converter or its immediate surroundings. The setpoints to be limited may be given in particular for one or several of the following variables of the power converter: a reactive current Iq on the AC-voltage side, an actual current Ip on the AC-voltage side, a current IDC on the DC-voltage side, a power converter-internal circulating current Icircuit, a voltage UDC on the DC-voltage side, a voltage UAC on the AC voltage side, a frequency on the AC-voltage side, a total energy at the power converter (the sum of the generated voltages), or any linear combination of the previous variables.

One advantage of the method according to the present invention is that it is possible to achieve better utilization of the power converter, due to the temporally dynamic adjustment of the limiting value, taking the power converter temperature into consideration. In particular, it is possible to increase the dynamic performance of the power converter without increasing its overall cost. The method according to the present invention allows the power converter to continue operation in the event of short-term overloads, and at the same time avoids shutdowns caused by superordinate protective devices. In this way, in particular, costly transmission failures may be prevented. In addition, during stationary operation of the power converter, increased transmission power or reactive power is made possible under suitable circumstances (for example, in the case of low outside temperatures and a resulting increased output of a cooling system of the power converter).

It is considered to be particularly advantageous if the power converter temperature is a semiconductor temperature of a semiconductor switch of the power converter. The semiconductor temperature is preferably a semiconductor junction temperature at a junction of the semiconductor. Several semiconductor temperatures, or generally, other power converter temperatures (for example, a housing temperature or temperatures at other components of the power converter, such as switchgear, surge arresters, etc.) may also be used and combined with one another to determine and define the limiting value or limiting values. For example, when determining the limiting value or limiting values, the semiconductor temperatures of several, preferably all, semiconductor switches used in the power converter may be used or taken into consideration. In such a case, the power converter temperature may, for example, be formed as an average value, a median value, or a maximum value of the semiconductor temperatures. The use of the semiconductor temperatures is advantageous, since the semiconductor switches are the particularly relevant active components of the power converter.

Preferably, the power converter temperature is determined by means of a temperature model of the semiconductor switch. The semiconductor temperature may be calculated by means of the temperature model. The determination may be carried out by a suitable part of the control system having sufficient computing power, wherein all necessary parameters are supplied to this part of the control system. The temperature model or the module by means of which the temperature model is created or determined and carried out in a temporally dynamic manner may, for example, comprise one or several of the following input variables: a branch current in a power converter branch, a duty cycle of the power converter branch, a voltage present at a power converter branch, thermal parameters of the semiconductor switch. By means of the temperature model, it is possible to determine or at least estimate the semiconductor temperature using measured variables which are known in any case. Thus, a complex direct temperature measurement at a high voltage potential is not required here.

Particularly preferably, the temperature model comprises a power loss model of the semiconductor switch. For this purpose, the temperature model also uses loss parameters of the semiconductor switch. In this way, it is possible to increase the accuracy of the modeling of the semiconductor temperature, since the thermal losses in the semiconductor are taken into consideration.

According to one embodiment of the present invention, the power converter is a modular multistage converter, and the power converter temperature is obtained from one or several of the following measurement parameters: a branch current of a power converter branch of the power converter, an energy storage device voltage of an energy storage device of a switching module of the power converter, a switching state of the switching module. In addition or alternatively, for example, an average capacitor voltage of all capacitors of a power converter branch may be used as a measurement parameter for the temperature model. A modular multilevel converter is a voltage-source converter, which is characterized by a modular design. In each power converter branch, the multilevel converter comprises a series connection of two-pole switching modules. Each switching module comprises several semiconductor switches and an energy storage device, usually in the form of a capacitor. The semiconductor switches can be actuated independently of one another, so that a switching module voltage can be set at terminals of the respective switching module. Examples of switching module topologies include the half-bridge and full-bridge switching modules which are known to those skilled in the art. The method according to the present invention is particularly advantageous for the operation of a modular multilevel converter, as it is thereby possible to avoid overdimensioning in the design of the multilevel converter.

It is also conceivable that the power converter temperature is obtained using a temperature measurement at the power converter. The temperature measurement may, for example, comprise a cooling temperature of a cooling medium of a cooling system for cooling the power converter. In particular, a cooling water temperature of cooling water for cooling the power converter may be measured. Of course, the power converter temperature may be measured directly by means of suitable measures, for example, by means of a measurement device for measuring a semiconductor temperature at the semiconductor switch. The power converter temperature may be measured particularly accurately by means of direct temperature measurement of the power converter temperature, or by using a temperature measurement, when modeling the power converter temperature.

Likewise, it may be advantageous if the volume flow of the cooling medium is used for determining the limiting value.

Generally, setpoints of several control parameters are used in the power converter control. Preferably, the at least one limiting value is determined as a function of setpoints of further control parameters. If several limiting values are determined simultaneously for several control parameters, this creates a multidimensional problem having interdependent variables, as the different control parameters are possibly not limited independently of one another. At the same time, despite the interdependencies, one or several degrees of freedom remain when determining the limiting values. These degrees of freedom may be used to select the individual limiting values according to a prioritization, according to the requirements placed on the power converter system or on the energy transmission. This selection process may also be referred to as prioritization. For example, in the event of a dynamic overload, reactive and active power of the power converter system may be limited in a prioritized manner, for example, on the basis of an updated requirement profile.

The present invention furthermore relates to a power converter system comprising a power converter and a control device for controlling the power converter.

Such a power converter system is, for example, disclosed in the aforementioned EP 3 392 994 A1.

The object of the present invention is to propose a power converter system of the generic type, which enables the most reliable operation possible.

According to the present invention, the object is achieved with a power converter system of the generic type, in that the control device is configured to limit a setpoint of a control parameter by means of at least one limiting value which is determined, or can be determined, in a temporally dynamic manner, as a function of a power converter temperature.

The advantages of the power converter system according to the present invention result in particular from the previously described advantages in connection with method according to the present invention.

Preferably, the power converter is a modular multilevel converter. It is known that modular multilevel converters are particularly complex, wherein their internal variables (for example, the semiconductor temperature) change over time during operation, largely independently of their external variables (current, voltage, reactive power). A static limitation of the external variables can therefore not ensure comprehensive protection against thermal overloads of the power converter or its semiconductors. For this reason, the advantages of the solution according to the present invention of temporally dynamic, temperature-dependent setpoint limiting become particularly apparent with respect to a modular multilevel converter.

BRIEF DESCRIPTION OF THE SEVERAL VIEWS OF THE DRAWING

The present invention will be described in greater detail below with reference to the exemplary embodiments depicted in FIGS. 1 to 5.

FIG. 1 depicts a schematic representation of an exemplary embodiment of a modular multilevel converter;

FIG. 4 depicts an exemplary embodiment of a control device for a power converter system according to the present invention;

FIG. 5 depicts an example of temperature modeling for a method according to the present invention.

DETAILED DESCRIPTION OF THE INVENTION

Figure 1:
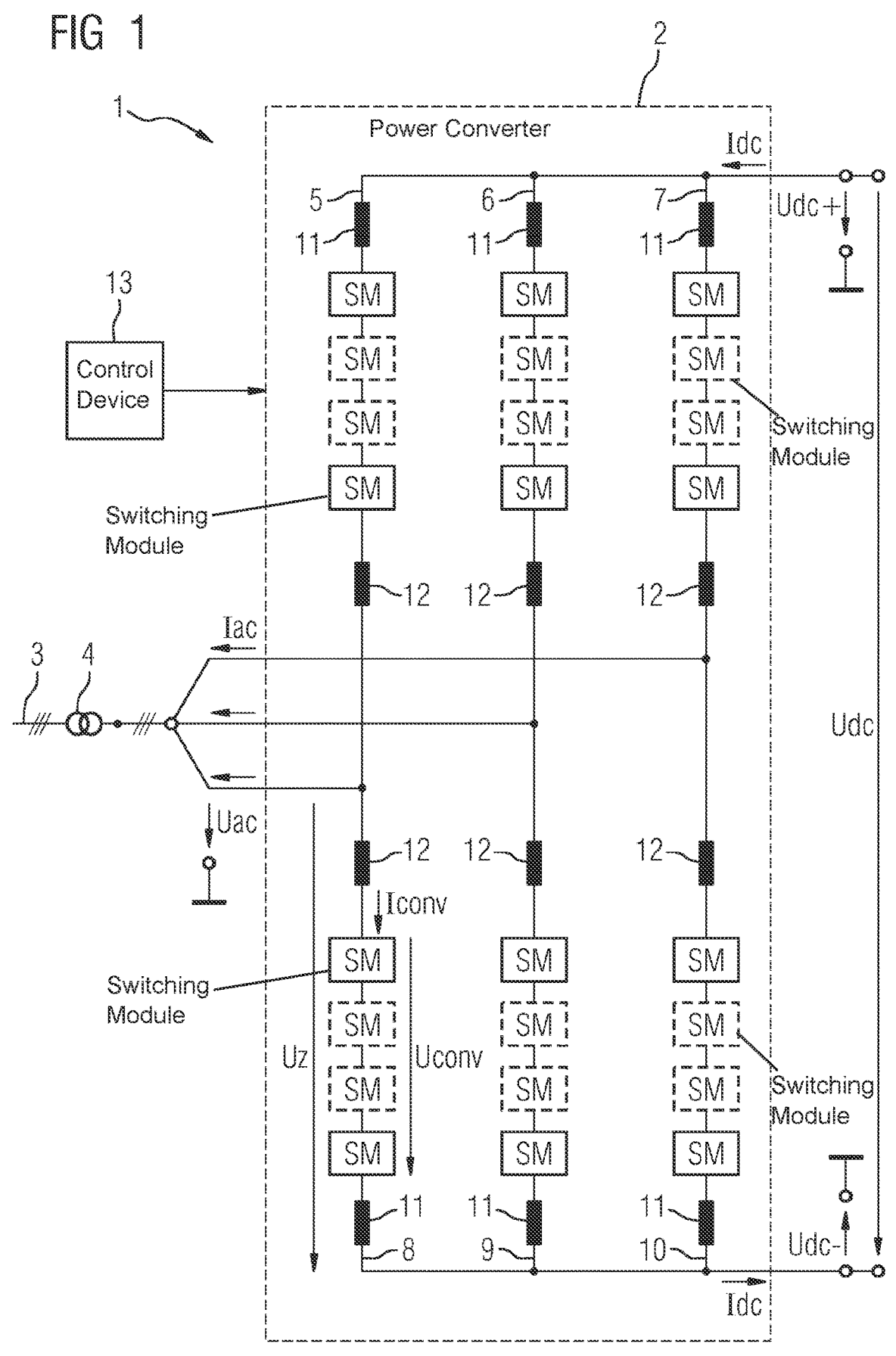
Figure 2:
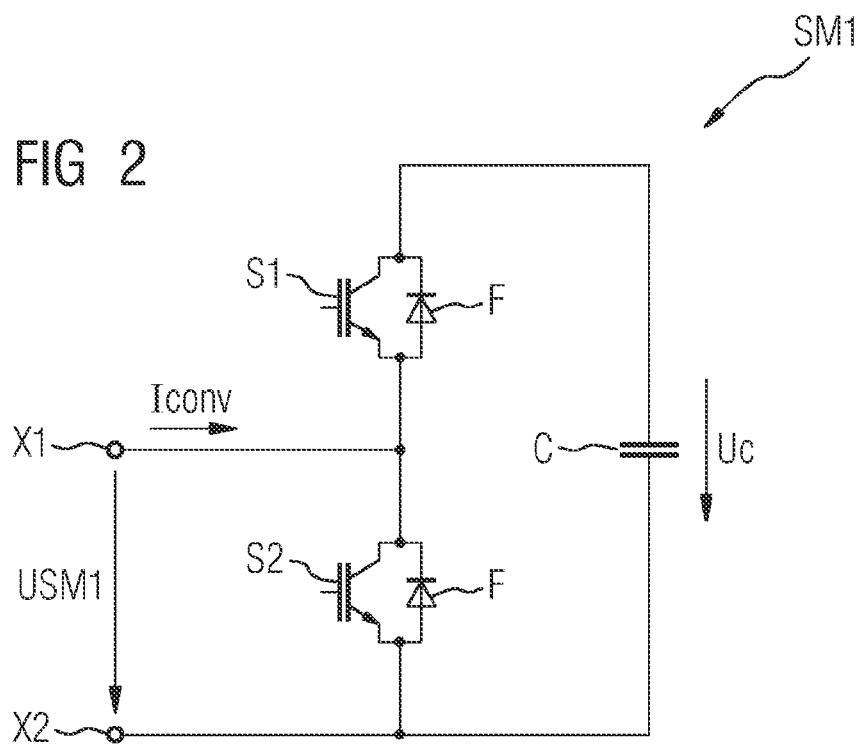
FIG. 2 depicts a schematic representation of an example of a half-bridge switching module.

FIG. 1 depicts a power converter system 1. The power converter system 1 comprises a modular multilevel converter (MMC) 2, which, in the depicted example, is used for converting an AC voltage of an AC voltage grid 3, to which the MMC 2 is connected by means of a grid transformer 4, into a DC voltage Udc.

The MMC 2 comprises six power converter branches 5 to 10, which are interconnected in a double star connection. Each of the similarly configured power converter branches 5 to 10 comprises two arm inductors 11, 12 and a series connection of two-pole switching modules SM. In the exemplary embodiment depicted in FIG. 1, all switching modules SM have the same configuration, but this is generally not necessary. The number of switching modules SM in each power converter branch 5 to 10 is also basically arbitrary and may be adapted to the respective application. The switching modules SM may, for example, be full-bridge switching modules or half-bridge switching modules, the configuration of which will be described in greater detail in FIGS. 2 and 3 below. Each switching module SM comprises controllable semiconductor switches, for example, IGBTs or the like, an energy storage device, and a control module, by means of which the semiconductor switches can be actuated.

The power converter system 1 further comprises a central control device 13, which is configured for controlling the MMC 2 and for actuating the switching modules SM. From a superordinate instance, the control device 13 receives specifications with respect to the required active power and reactive power, which are converted by the control unit into setpoints of some control parameters. The control parameters may, for example, be a voltage Uac on the AC-voltage side, a current Iac on the AC-current side, a current Idc on the DC-current side, and/or a voltage Udc on the DC-current side. In power converter systems which are designed as a symmetrical monopole, a voltage between the positive DC-voltage pole and the ground potential, Udc+, and a voltage between the negative DC-voltage pole and the ground potential, Udc−, are significant.

FIG. 2 depicts a first switching module SM1, which is suitable as a switching module SM for the power converter of FIG. 1, and which is connected in a half-bridge circuit. A parallel connection of a first semiconductor switch S1 and a capacitor C is arranged in a capacitor branch. A second semiconductor switch is arranged in a bridge branch between two terminals X1, X2 of the first switching module SM1. A flyback diode F is respectively connected in antiparallel to the two semiconductor switches S1, S2. By means of suitable actuation of the two semiconductor switches S1, S2, a switching module voltage USM1 which corresponds to the capacitor voltage Uc, or a zero voltage, may be generated at the terminals X1, X2.

Figure 3:
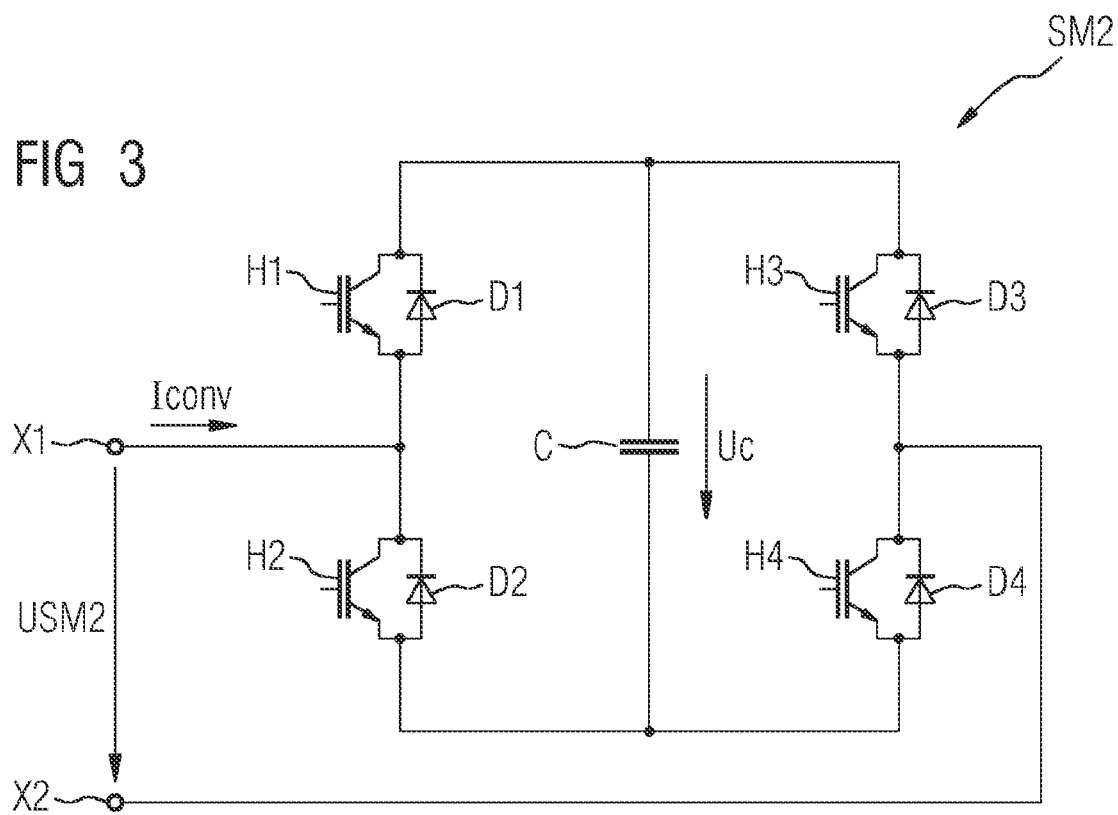
FIG. 3 depicts a schematic representation of an example of a full-bridge switching module.

FIG. 3 depicts a second switching module SM2 which is suitable as a switching module SM for the power converter of FIG. 1, and which is connected in a full-bridge circuit. The switching module SM comprises a deactivatable first semiconductor switch H1 to which a first flyback diode D1 is connected in antiparallel, a second deactivatable semiconductor switch H2 to which a second flyback diode D2 is connected in antiparallel, wherein the first and second semiconductor switches H1, H2 are connected to one another in a first semiconductor series circuit and have the same forward direction. The switching module SM2 furthermore comprises a third deactivatable semiconductor switch H3 to which a third flyback diode D3 is connected in antiparallel, and a fourth deactivatable semiconductor switch H4 to which a fourth flyback diode D4 is connected in antiparallel, wherein the third and fourth semiconductor switches H3, H4 are connected to one another in a second semiconductor series circuit and have the same forward direction. The two semiconductor series circuits are arranged in parallel to one another and to an energy storage device C in the form of a capacitor, to which a capacitor voltage Uc is applied. In addition, the switching module SM2 furthermore comprises a first terminal X1 which is arranged between the semiconductor switches H1, H2 of the first semiconductor series circuit, and a second terminal X2 which is arranged between the semiconductor switches H3, H4 of the second semiconductor series circuit. By means of suitable actuation of the semiconductor switches H1 to H4, a switching module voltage USM2 may be generated at the terminals X1, X2, which corresponds to the capacitor voltage Uc, corresponds to the negative capacitor voltage −Uc, or a zero voltage.

FIG. 4 depicts a control device 13 for the power converter system of FIG. 1. The control device 13 comprises a conventional control component 14, which receives measured values M from the measuring device of the power converter 2 and transmits control signals S to the power converter 2. In addition, the control device 13 comprises a module 15 for temperature modeling or temperature calculation. The module 15 receives the measurement values M on the input side. On the output side, the module 15 provides a set of limiting values B which is sent to a prioritization module 16 for determining the prioritization of the control parameters or their setpoints. At the same time, the prioritization module 16 is connected on the input side to a distributed control and protection system 17, which derives setpoints Soll for the relevant control parameters from the measured values M, and transmits them to the prioritization module. By means of the prioritization module 16, it is determined which setpoints are limited in a prioritized manner. The setpoints, along with the limiting values, are then transmitted to the control component 14.

FIG. 5 depicts an example of temperature modeling which may be carried out in a method according to the present invention.

On the input side, a power loss model component VK receives a capacitor voltage Uc of a switching module, a duty cycle of a power converter branch in which the relevant switching module is arranged, a switching state a of a semiconductor of the switching module, the semiconductor temperature of which is to be determined or estimated, and a current Iconv in the relevant power converter branch, as input parameters. On the output side, the power loss model component VK provides a power loss L and transmits it to a temperature model component TK which also provides a coolant temperature Tv as an input parameter. By means of a pre-assigned thermal model T, the temperature model component TK determines a semiconductor temperature T(Tv, L) on the basis of the input parameters Tv, L. The semiconductor temperature T(Tv, L) is transmitted on the output side of the temperature model component TK to further components of the control system for further processing.

Figure 6:
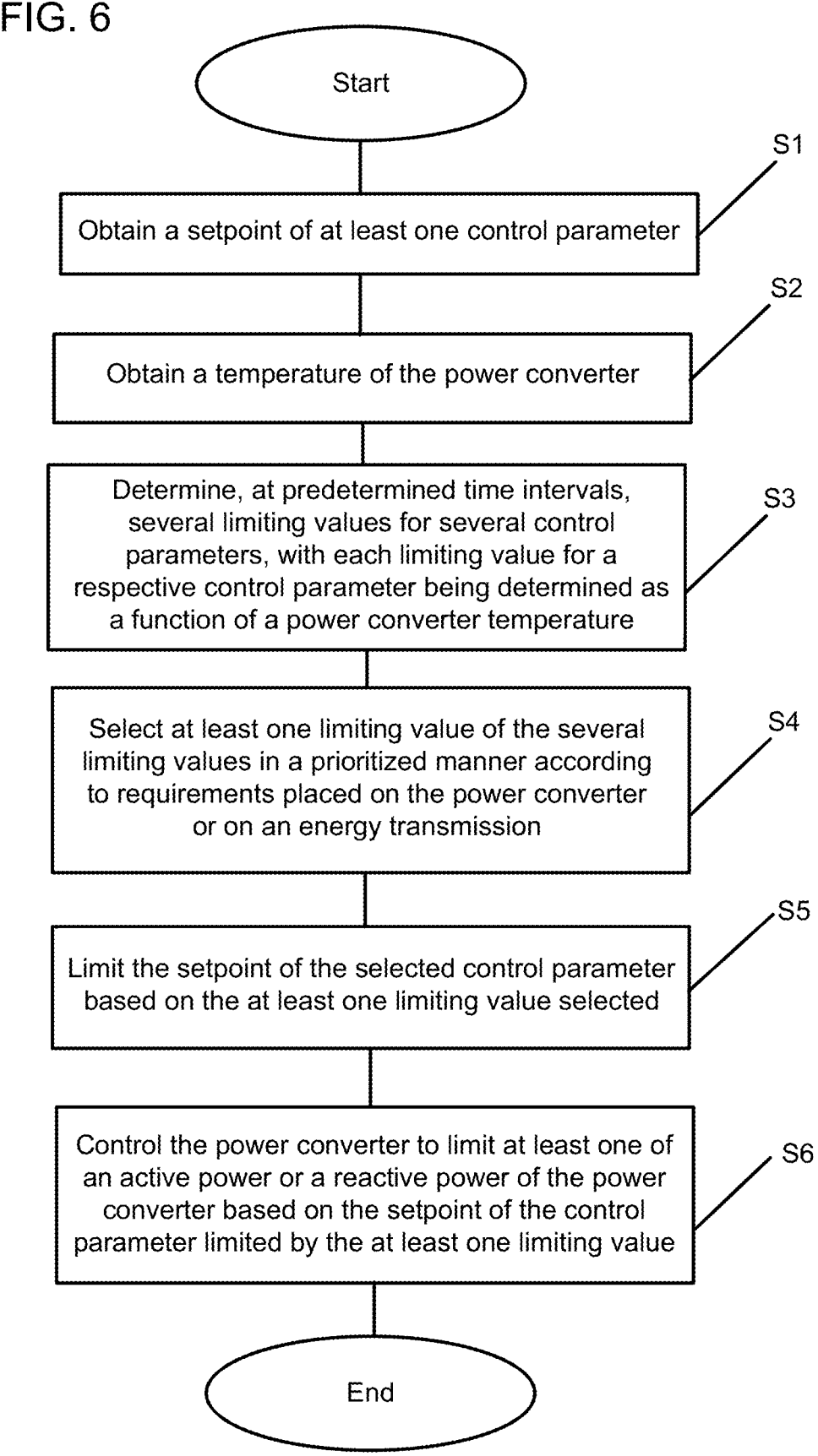
FIG. 6 is a flow chart illustrating a method of the invention.

FIG. 6 shows a flow chart illustrating a method for controlling a power converter. In step S1, a setpoint of at least one control parameter is obtained. In step S2, a temperature of the power converter is obtained. In step S3, several limiting values for several control parameters are determined at predetermined time intervals as a function of a power converter temperature. In step S4, at least one limiting value is selected in a prioritized manner. In step S5, the setpoint of the selected control parameter is limited based on the at least one limiting value selected. In step S6, the power converter is controlled to limit at least one of an active power or a reactive power of the power converter based on the setpoint of the control parameter limited by the at least one limiting value.

The invention claimed is:

1. A method for controlling a power converter, in which a setpoint of a control parameter is limited by at least one limiting value, which comprises the step of:
    determining, at predetermined time intervals, several limiting values for several control parameters, with each limiting value for a respective control parameter being determined as a function of a power converter temperature;

selecting at least one limiting value of said several limiting values in a prioritized manner according to requirements placed on the power converter or on an energy transmission;

limiting the setpoint of the control parameter of the power converter based on the at least one limiting value selected;

selecting the control parameter from the group consisting of a reactive current on an AC-voltage side of the power converter, an actual current on the AC-voltage side of the power converter, a current on a DC-voltage side of the power converter, a power converter-internal circulating current, a voltage on the DC-voltage side of the power convert, a voltage on the AC voltage side of the power converter, a frequency on the AC-voltage side of the power converter, a total energy at the power converter, and any linear combination of control parameters; and controlling the power converter to limit at least one of an active power or a reactive power of the power converter based on the setpoint of the control parameter limited by the at least one limiting value.

2. The method according to claim 1, wherein the power converter temperature is a semiconductor temperature of a semiconductor switch of the power converter.

3. The method according to claim 2, wherein the power converter temperature is determined based on a temperature model of the semiconductor switch.

4. The method according to claim 3, wherein the temperature model contains a power loss model of the semiconductor switch.

5. The method according to claim 3, wherein the power converter is a modular multistage converter, and the power converter temperature is obtained from at least one of following measurement parameters:
- a branch current of a power converter branch of the power converter;
- an energy storage device voltage of an energy storage device of a switching module of the power converter; and
- a switching state of the switching module.

6. The method according to claim 1, wherein the power converter temperature is obtained using a temperature measurement at the power converter.

7. The method according to claim 6, which further comprises measuring a cooling water temperature of cooling water for cooling the power converter.

8. The method according to claim 1, which further comprises determining at least one limiting value of the several limiting values in dependence on setpoints of further control parameters.

9. A power converter system, comprising:
a power converter; and
a controller for controlling said power converter, said controller configured to:
determine, at predetermined time intervals, several limiting values for several control parameters, with each limiting value for a respective control parameter being determined as a function of a power converter temperature;
select at least one limiting value of said several limiting values in a prioritized manner according to requirements placed on the power converter or on an energy transmission;
limit the setpoint of the control parameter of the power converter based on the at least one limiting value selected; and
select the control parameter from the group consisting of a reactive current on an AC-voltage side of the power converter, an actual current on the AC-voltage side of the power converter, a current on a DC-voltage side of the power converter, a power converter-internal circulating current, a voltage on the DC-voltage side of the power convert, a voltage on the AC voltage side of the power converter, a frequency on the AC-voltage side of the power converter, a total energy at the power converter, and any linear combination of control parameters.

10. The power converter system according to claim 9, wherein said power converter is a modular multistage converter.

* * * * *